US008184531B2

(12) United States Patent
Guillouard et al.

(10) Patent No.: US 8,184,531 B2
(45) Date of Patent: May 22, 2012

(54) METHOD OF MANAGING AN INTERFACE COMPRISING MEANS FOR CONTROLLING REMOTE TERMINALS (75) Inventors: Karine Guillouard, Chantepie (FR); Stéphane Atheo, Orvault (FR); David Blanchet, La Bouëxiere (FR); Jean-Marie Bonnin, Corps Nuds (FR); Lucian Suciu, Cesson Sevigne (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 12/066,038

(22) PCT Filed: Sep. 6, 2006

(86) PCT No.: PCT/EP2006/008654
§ 371 (c)(1),
(2), (4) Date: Sep. 11, 2008

(87) PCT Pub. No.: WO2007/028577
PCT Pub. Date: Mar. 15, 2007

(65) Prior Publication Data
US 2009/0073879 A1    Mar. 19, 2009

(30) Foreign Application Priority Data
Sep. 9, 2005   (FR) ..................... 05 09203

(51) Int. Cl.
*G01R 31/08* (2006.01)
(52) U.S. Cl. ......... 370/230; 370/235; 709/225; 709/232
(58) Field of Classification Search .......... 370/229–238, 370/252–253, 223–226, 392–427
See application file for complete search history.

(56) References Cited

U.S. PATENT DOCUMENTS

| 5,953,318 | A * | 9/1999 | Nattkemper et al. | 370/236 |
| 6,768,738 | B1 * | 7/2004 | Yazaki et al. | 370/392 |
| 2001/0024452 | A1 * | 9/2001 | Liu et al. | 370/468 |
| 2003/0026207 | A1 * | 2/2003 | Loguinov | 370/235 |
| 2003/0078065 | A1 * | 4/2003 | Hoagland et al. | 455/517 |

(Continued)

FOREIGN PATENT DOCUMENTS
EP    1 633 092    3/2006

(Continued)

OTHER PUBLICATIONS

International Search Report dated Oct. 20, 2006 for corresponding International Application No. PCT/EP2006/008597, filed Sep. 4, 2006.

(Continued)

*Primary Examiner* — Pao Sinkantarakorn
*Assistant Examiner* — Iqbal Zaidi
(74) *Attorney, Agent, or Firm* — David D. Brush; Westman, Champlin & Kelly, P.A.

(57) ABSTRACT

A method is provided for transmission within a telecommunication system, which includes a plurality of terminals that can exchange data flows therebetween. The method includes at least: a step of comparing a maximum throughput value offered by an interface with a cumulative value of the throughputs of flows that are intended to pass through the interface; and a step of adjusting the throughput of a particular flow following transmission of an adjustment value to a flow-emitting entity, which is executed when the maximum value is less than the cumulative value. The method enables a given terminal to adjust the throughput of a flow even when the flow is generated by a remote terminal.

14 Claims, 3 Drawing Sheets

U.S. PATENT DOCUMENTS

2006/0077964 A1     4/2006    Wu et al. .................. 370/352

FOREIGN PATENT DOCUMENTS

| WO | WO 2005/125116 | | 12/2005 |
|---|---|---|---|
| WO | WO 2005125116 | * | 12/2005 |

OTHER PUBLICATIONS

French Search Report dated Apr. 12, 2006 for corresponding French Application No. FR0509202, filed Sep. 9, 2005.

International Search Report dated Dec. 7, 2006 for corresponding International Application No. PCT/EP2006/008654 filed Sep. 6, 2006.

French Search Report dated Apr. 12, 2006 for corresponding French Application No. FR0509203 filed Sep. 9, 2005.

Office Action dated Dec. 1, 2009 from the United States Patent and Trademark Office for corresponding U.S. Appl. No. 12/066,173.

Office Action dated Aug. 4, 2010 from the United States Patent and Trademark Office for corresponding U.S. Appl. No. 12/066,173.

Office Action dated Apr. 4, 2011 from the United States Patent and Trademark Office for corresponding U.S. Appl. No. 12/066,173.

Notice of Allowance dated Oct. 25, 2011 from the United States Patent and Trademark Office for corresponding U.S. Appl. No. 12/066,173.

André, F. et al. "Optimized Support of Multiple Wireless Interfaces within an IPv6 End-Terminal", Oct. 5, 2003.

Suciu, L. et al. "Achieving 'Always Best Connected' Through Extensive Profile Management," 9th International Conference on Personal Wireless Communications, Sep. 2004.

Rose, O. "The Q-bit Scheme—Congestion Avoidance Using Rate Adoption," Computer Communication Revenue, ACM, New York, NY, US, vol. 22, No. 2, Apr. 1, 1992.

Loguino, D. et al. "Increase-Decrease Congestion Control for Real-Time Streaming: Scalability," Proceedings IEEE Infocom 2002. The Conference on Computer Communications. 21st Annual Joint Conference of the IEEE Computer and Communications Societies. New Tork, NY, Jun. 23-27, 2002, Communications, vol. 1 of 3. Conf21, Jun. 23, 2002.

Ting, P.C. et al. "Dynamic Multithreshold Rate Control Mechanisms for Supporting ABR Traffic in ATM Networks," IEEE Transactions on Industrial Electronics, IEEE Service Center, Piscata Way, NJ, US, vol. 45, No. 1, Feb. 1998.

Qian, Wang et al. "TCP-Friendly Congestion Control Schemes in the Internet," Info-Tech and Info-Net, 2001. Proceedings ICII 2001—Beijing, 2001 International Conferences on Oct. 29-Nov. 1, 2001 Piscata Way, NJ, US, IEEE, vol. 2, Oct. 29, 2001.

Francis, M. et al. "A Flow Control Framework for ABR Services in Wireless/Wired ATM Networks," Vehicular Technology Conference, 1999 IEEE 49th Houston, TX, US May 16-20, 1999, Piscata Way, NJ, US, IEEE, vol. 2, May 16, 1999.

Blado, N. et al. "RTCP Feedback Based Transmission Rate Control for 3G Wireless Multimedia Streaming," Personal, Indoor and Mobile Radio Communications, 2004. PIMRC 2004. 15th IEEE International Symposium on Barcelona, Spain Sep. 5-8, 2004, Piscata Way, NJ, US, IEEE, vol. 3, Sep. 5, 2004.

* cited by examiner

METHOD OF MANAGING AN INTERFACE COMPRISING MEANS FOR CONTROLLING REMOTE TERMINALS

CROSS-REFERENCE TO RELATED APPLICATIONS

This Application is a Section 371 National Stage Application of International Application No. PCT/EP2006/008654, filed Sep. 6, 2006 and published as WO 2007/028577 on Mar. 15, 2007, not in English.

FIELD OF THE DISCLOSURE

The present disclosure relates to a method for the transmission of data within a telecommunications system including a plurality of terminals capable of exchanging data flows through at least one communications network.

BACKGROUND OF THE DISCLOSURE

A method of this kind is described in an article "Achieving 'Always Best Connected' through Extensive Profile Management", presented at the 9th International Conference on Personal Wireless Communications, September 2004. In systems implementing the known method, multiple communications networks enable the terminals to communicate with each other through a plurality of interfaces with which each terminal is provided.

The known method enables detection of the loss of an interface during the operation of a given terminal, and the almost instantaneous rerouting of a stream, to which the lost interface will have been initially assigned, to another interface using a first decision-making algorithm called a fast algorithm which theoretically enables the saving of stream continuity. A second decision-making algorithm called a slow algorithm is furthermore provided to obtain an optimum distribution of the streams over the various remaining interfaces, after any reassigning of the stream or streams done by the fast algorithm. Furthermore, an appearance or re-appearance of an interface will be taken into account by the fast algorithm which could redirect streams traveling over other less advantageous interfaces towards this new interface, such a redirection being then followed by implementation of the slow algorithm in order to optimally distribute the stream over the various interfaces existing in the terminal considered.

However, the inventors have noted that the consecutive implementation of dual fast and slow algorithms does not provide for optimum operation of the telecommunications system, and more particularly of the terminal, in certain situations which will unfailingly occur when said system operates in real conditions. These particular conditions include one highly probable situation in which an interface does not disappear totally but is disturbed temporarily so that this interface no longer provides the streams designed to cross it with anything other than a total throughput rate that is very small when compared with the throughput rate initially planned for this interface. In such a situation, according to the teaching of the above-mentioned prior art, it is the slow algorithm that will have to take corrective measures in order to find a new optimum distribution of the streams: this entails a risk of introducing a period of latency with a duration that is big enough for the streams traveling through the saturated interface to be quite simply interrupted and lost, and this is unacceptable.

SUMMARY

A method of data transmission is provided, which includes:
a step of comparison between a maximum throughput rate value offered by an interface through which this particular stream travels and a cumulative value resulting from a sum of throughput rate values to be assigned to the streams that are to travel through said interface, and
a throughput rate setting step designed to be executed by a sender entity sending said particular stream when the maximum throughput rate value offered by the interface is below the cumulated value and after reception of a setting value, during which the lowest value between said setting value and the value currently assigned to said particular stream by the sender entity is assigned to the throughput rate of said particular stream.

An embodiment of the invention enables a given terminal to direct a throughput rate setting of a particular stream that travels through one of its interfaces when said interface is congested, such a setting being possible both when the sender entity is included in the terminal considered and then generates a stream called an outgoing stream, and when the sender entity is included in a remote terminal and then sends a stream called an incoming stream intended for the terminal considered. Thus, in an assumption of this kind, this remote terminal will have to adjust the throughput rate of the stream or streams that it sends, not only as a function of its own sending capacity but also as a function of a capacity that the given terminal will have to absorb and process this stream which it is intended to receive, the capacity that is implicitly described by the content of the setting signal as a function of parameters pertaining to the activity of the given terminal which the remote terminal cannot know.

According to a particular embodiment of the invention, the throughput rate setting step is executed by the sender entity after reception of the setting value in assigning to the throughput rate of the particular stream, the lowest value between the setting value and the value currently assigned to said particular stream by the sender entity.

This mode of implementation is aimed at ensuring that the setting of the throughput rate by the sender entity can only be done in a sense of a reduction so that a safety system is thus set up with a view to making it impossible to have an increase in throughput rate that would be incompatible with the resources proper to the sender entity, a situation that could otherwise occur when the setting value is higher than the value of the throughput rate currently assigned to the particular stream by the sender entity.

The throughput rate values that come into play in the computation of the cumulated value may correspond to streams effectively traveling through the interface considered, but such a value may also correspond to a stream that does not yet travel through the interface but whose setting up has been requested from the terminal considered by a remote terminal. In such a situation, the remote terminal will have sent a request for setting up a new stream intended for the terminal considered, this request specifying a throughput rate value to be assigned to said new stream. If this throughput rate value to be assigned is high enough to prompt a saturation of the interface, the terminal considered will send the remote terminal in return a setting signal that is a carrier of a throughput rate value considered acceptable by the terminal considered. Should the throughput rate value specified by the remote terminal be considered to be acceptable by the terminal considered, it could send an acknowledgment signal having a shape similar to that of a setting signal that carries a setting value equal to the value specified, in order to give confirmation to the remote terminal of acceptance by the terminal considered of this throughput rate value for the new stream whose setting up has been requested.

According to a particular mode of implementation of the invention, a method such as the one described further above includes a step for determining a plurality of nominal throughput rate values acceptable for at least one particular data stream, the setting value transmitted during execution of the step for setting the throughput rate of a particular stream being formed by the nominal throughput rate value proper to said particular stream which is immediately lower than its current throughput rate.

The existence of a scale of several acceptable nominal throughput rate values for one or more streams going through an interface will enable the adjustment in stages of the different throughput rates of the streams provided with such scales of values and therefore permits greater precision in a distribution of bandwidth between various simultaneous streams. In other modes of implementation of the invention, it is however possible to carry out only one throughput rate reduction operation for each stream in order to lower this throughput rate to its minimum value at one stroke.

According to one variant of this particular mode of implementation of the invention, a method as described here above furthermore includes a step of classification, in a predetermined order of priority, of the various streams assigned to each interface, the streams that have to be subjected to a throughput-rate setting step being then intended for selection by ascending order of priority.

The setting up of a classification by order of priority makes it possible, in the event of saturation of an interface, to preferably reduce the throughput rates of non-priority streams to their minimum values, without modifying the throughput rates of the priority streams. The classification step thus makes it possible to give preference to the transmission of certain types of data relative to others. For example, data defining stimuli having to be restituted in real time to a user of the terminal, such as data conveyed in an audio stream or a video stream in the context of a videophone application, could be considered to be priority data relative to a stream of text data for the transmission of which a latency could seem to be acceptable because it is imperceptible to the user who, on the contrary, could not fail to be inconvenienced by an interruption, even a momentary interruption, of the audio or video stimuli. Thus, in the event of saturation of the interface conveying these three streams, the textual data stream, which will have been preliminarily assigned an order of priority lower than the one assigned to the audio and visual streams, will be subjected to the throughput rate setting step so as to release bandwidth to the benefit of other streams having higher priority.

According to one variant of the invention, designed to be implemented within a telecommunications system including a plurality of communications networks with which at least one of the terminals is capable of communicating through numerous interfaces, a method compliant with the above description will furthermore advantageously include a switching step designed to be executed within a terminal of this kind, during which another interface is assigned to a stream subjected to this switching step when the maximum throughput rate value offered by the interface is below the cumulated value.

The switching step planned in this variant of the invention is aimed at decongesting a saturated interface in a situation in which one or more throughput rate reduction steps will have been insufficient to achieve this result, by redirecting one or more data streams to an interface other than their current interface, which is impossible in the prior art according to which such a switching operation is possible only in the event of total loss of the current interface. Thus, an embodiment of the present invention is used to achieve an optimum and dynamic management of bandwidth proper to the various interfaces in keeping with variations in conditions of operation of said interfaces, the stream that has to be subjected to a switching step being capable for example of being selected by ascending order of priority.

One advantageous mode of implementing this variant of the invention enables the selection, with a view to switching, of that one of the streams whose disappearance will have the most beneficial effect on efficient exploitation of the resources offered by the interface. In this advantageous mode of implementation, the above-described method furthermore includes a step of selection of that one of these streams having a minimum throughput rate that makes it possible, when it is subtracted from the sum of the values of throughput rates assigned to the streams that are to travel through the interface considered, to obtain a value that is closest to that of the available throughput rate offered by this interface, the stream thus selected being then intended for submission to a switching step.

A selection step of this kind enables the exploitation of the entire bandwidth of an interface in subjecting, to the switching step, only the stream or streams whose disappearance will give a total transmission throughput rate through the interface considered to be as close as possible to the throughput rate made actually available by this interface at a given point in time.

A comparison of this kind of the effects produced by the disappearance of streams could be done only between streams having a same degree of priority but such a comparison could alternatively be done independently of the respective degrees of priority of these streams, the degrees of priority being then designed to be taken into account only when there are two streams whose disappearance would produce identical effects in terms of release of bandwidth.

According to one particular mode of implementation of the variant of the invention described further above, any subjecting of the stream considered to the switching step will be inhibited so long as the throughput rate effectively allocated by the interface to said stream considered has not been reduced to a minimum value that will be constituted, when several acceptable nominal throughput rate values will have been determined for the stream during the determining step, by the lowest of said values.

This particular mode of implementation of the variant of the invention makes it possible, in the event of saturation of an interface, to choose to make a reduction preferably in the throughput rates of the non-priority streams down to their minimum values without modifying the throughput rate of the priority streams and, if this step is not sufficient to decongest the interface, it makes it possible, at the switching step and in ascending order of priority, to subject these non-priority streams to the switching step without any alteration in the throughput rates of the priority streams.

According to another particular embodiment of this variant of the invention, the switching step could be inhibited so long as the throughput rates effectively allocated by the interface to the streams that could go through it have not all been reduced to their respective minimum values.

In this particular embodiment, it will have been considered to be preferable to make a reduction of throughput rates distributed over all the streams that go through a saturated interface whether or not the streams are priority streams, before effectively subjecting one or more of these streams to the switching step in ascending order of priority.

According to a preferred mode of implementation of the variant of the invention described further above, the method that is compliant to it is characterized in that it furthermore includes a step for increasing the throughput rate following a switching step and designed to increase the throughput rate of a particular stream subjected to said increasing step.

The increasing step is of a particular type of setting step for the execution of which the sender entity will assign the setting value to the throughput rate of the stream considered except when such a value is too great to be compatible with the resources available to said sender entity, in which case this sender entity will signify its incapacity to make the required increase.

The execution of one or more increasing steps after the non-priority streams have had their throughput rates reduced to minimum values or after they have been switched to other interfaces will authorize a new assigning of resources thus released to the benefit of the priority streams, thus enabling completion of the optimizing of bandwidth management achieved through an embodiment of the invention.

An embodiment of the invention also relates to a signal, taken as a product obtained directly during the implementation of a method compliant with the above description, this signal being intended for the conveying of a particular data stream through an interface included in a terminal, said signal including at least one field defining a minimum throughput rate intended for the forming of a component having a cumulative value resulting from a sum of throughput rate values to be assigned to the streams that are to travel through said interface, said cumulative value being intended for comparison, within said terminal, with an available throughput rate offered by this interface.

The method of transmission described here above may be implemented in various ways, especially in wired form or in software form. An embodiment of the invention therefore, by way of a means useful for its implementation, also relates to a computer program product downloadable through a telecommunications network and/or stored in a memory of a central processing unit and/or stored in a memory carrier designed to cooperate with a reader of said central processing unit, said program being designed to be implemented within a terminal capable of sending and or receiving at least one data stream, said program including:

at least one instruction ordering the execution of a step of comparison between a maximum throughput rate value offered by an interface through which a particular stream travels and a cumulative value resulting from a sum of throughput rate values to be assigned to the streams that are to travel through said interface, and at least one instruction ordering the execution of a step of transmission of a setting value to a sender entity that has sent said particular stream, said transmission step being intended for execution when the maximum throughput rate value offered by the interface is lower than the cumulative value.

According to a hardware aspect, an embodiment of the invention also relates to a data carrier in which there is stored a computer program compliant with the above description or intended for the storage, with reference to an identifier designating a data stream conveyed by a signal as defined further above, of at least one value of a minimum throughput rate proper to said data stream.

According to one of its hardware aspects, an embodiment of the invention also relates to a telecommunications system including a plurality of terminals capable of mutually exchanging data streams through at least one communications network, said system being characterized in that it includes:

means of comparison between a maximum throughput rate value offered by an interface through which a particular stream travels and a cumulative value resulting from a sum of throughput rate values to be assigned to the streams that are to travel through said interface, and throughput-rate reduction means capable of setting the throughput rate of said particular stream and intended to be activated by transmission of a setting value to a sender entity sending said stream when the maximum throughput rate value offered by the interface is lower than the cumulative value.

According to yet another of its hardware aspects, an embodiment of the invention also relates to a terminal capable of sending and/or receiving at least one data stream, the terminal being characterized in that it includes:

means of comparison between a maximum throughput rate value offered by an interface through which a particular stream travels and a cumulative value resulting from a sum of throughput rate values to be assigned to the streams that are to travel through said interface, and throughput-rate reduction means capable of setting the throughput rate of said particular stream and intended to be activated after reception of a setting value intended to be produced when the maximum throughput rate value offered by the interface is lower than the cumulative value.

BRIEF DESCRIPTION OF THE DRAWINGS

The characteristics mentioned here above as well as other characteristics shall appear more clearly from the following description of an example of an embodiment, said description being made with reference to the appended drawings, of which.

DETAILED DESCRIPTION OF ILLUSTRATIVE EMBODIMENTS

Figure 1:
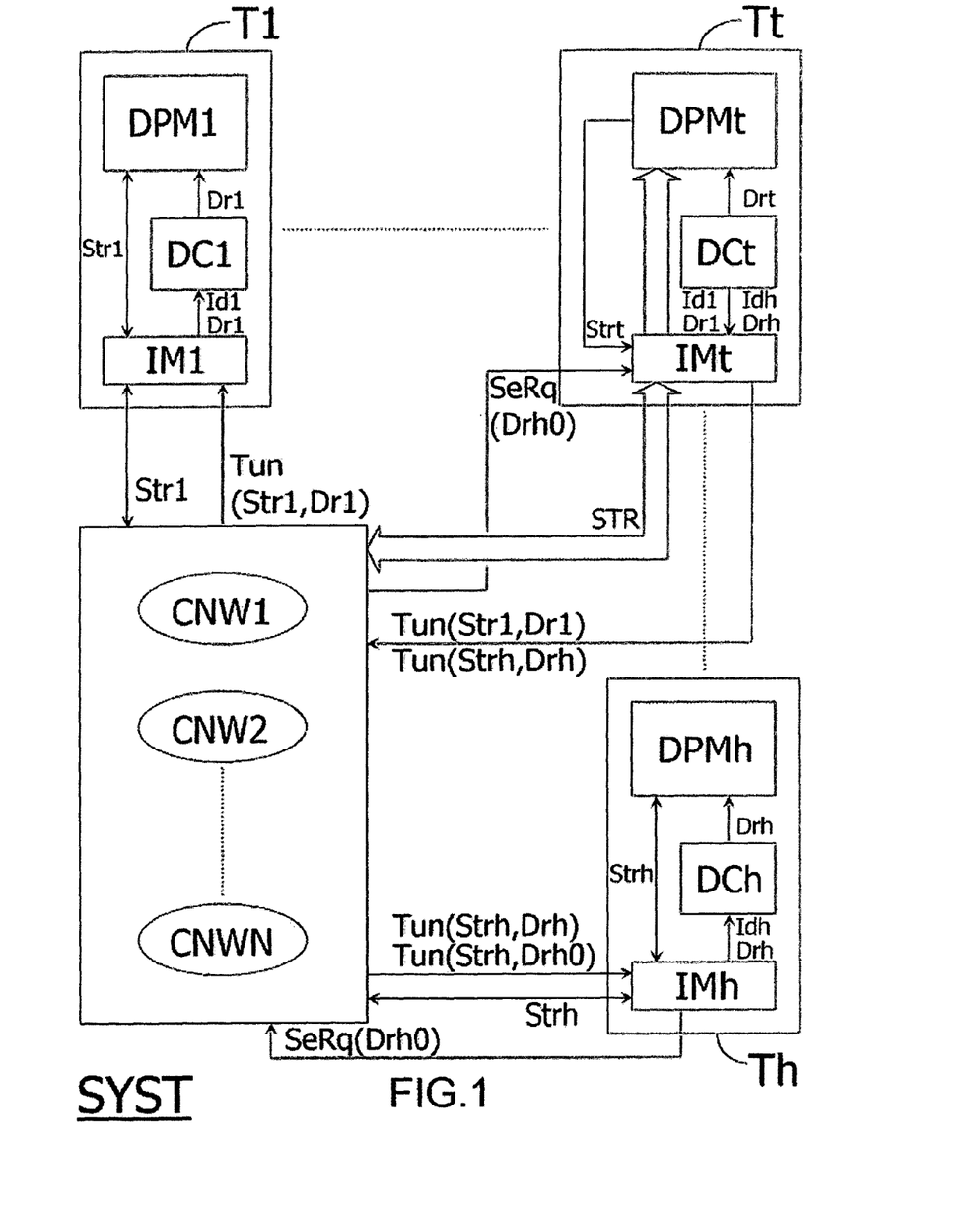
FIG. 1 is a function diagram that illustrates a telecommunications system in which an embodiment of the invention is implemented.

FIG. 1 gives a schematic view of a telecommunications system SYST comprising a plurality of terminals T1 . . . Tt . . . Th capable of mutually exchanging data streams Str1 . . . Strt . . . Strh through N distinct communications networks CNW1, CNW2, . . . , CNWN. These various communications networks could include one or more STN (switched telephone network) type wired networks, one or more GSM (global system for mobiles) or UMTS (universal mobile telecommunications systems) type networks or again one or more wireless local area networks such as networks compliant with the IEEE 802.3, IEEE 802.11 or IEEE 802.15 standards.

The different data streams Str1 . . . Strt . . . Strh are designed to be sent and/or received by processing means DPM1 . . . DPMt . . . DPMh for processing the data conveyed by said streams through a plurality of interface means IM1 . . . IMt . . . IMh. Each terminal Tj (for j=1 to H) furthermore includes a monitoring module DCj capable of comparing a maximum throughput rate value offered by an interface of the terminal considered through which there flows a particular stream and a cumulative value resulting from a sum of throughput rate values assigned to the streams effectively traveling through said interface. Each terminal Tj (for j=1 to h) furthermore includes a throughput rate reduction means located in the processing means DPMj included in said terminal Tj and capable of reducing the throughput rate of said particular stream and designed to be activated after reception of a setting value designed to be produced when the maximum throughput rate value offered by the interface considered is below the cumulative value.

Thus, in the example of implementation represented here, the interface means IMt of the terminal Tt are crossed by a composite stream STR containing particular streams Str1 and Strh respectively sent out by the terminals T1 and Th. When the surveillance module DCt included in the terminal Tt detects a saturation of one or more interfaces included in the interface means IMt, this surveillance module DCt produces, in the present example for each of the streams Str1 and Strh to which the respective identifiers Id1 and Idh have been assigned beforehand, a setting value Dr1 and Drh that has to enable the obtaining of a reduction of the throughput rates of said streams Str1 and Strh in order to release bandwidth at the level of the interface means IMt. These setting values Dr1 and Drh are transmitted by means of setting signals Tun(Str1,Dr1) and Tun(Strh,Drh) to the terminals T1 and Th which have been recognized by means of identifiers Id1 and Idh as containing respectively the sender entities that have sent particular streams Str1 and Strh, in this case the processing means DMP1 and DMPh, each of which will then assign the lowest among the setting value Dr1 or Drh and the currently applied value of the stream Str1 or Strh to the throughput rate of the stream Str1 or Strh, making it possible to make sure that the setting of the throughput rate by the sender entity can only be done as a reduction compatible with the resources of the terminal considered, T1 and Th.

It must be noted that the monitoring module DCt of the terminal Tt can simultaneously make an internal transmission of an additional setting value Drt to the processing means DPMt which will constitute a sender entity sending an outgoing stream Strt whose throughput rate must also be reduced.

Furthermore, while the values of the throughput rates coming into play in the computation of the cumulative value will most frequently correspond to streams effectively traveling through the interface considered, a throughput rate value Drh0 coming to play in the computation of the cumulative value can also correspond to a stream that is not yet traveling through the interface, for example the stream Strh before its effective set-up, which will then have been requested from the terminal Tt by the remote terminal Th using a set-up request SeRq(Drh0) for setting up a new stream Strh sent to the terminal Tt, said request specifying a throughput rate value Drh0 to be assigned to said new stream Strh. Should this throughput rate value Drh0 be high enough to prompt a saturation of the interface means IMt, the terminal Tt will send a setting signal Tun(Strh,Drh) in return to the terminal Th, this setting signal carrying a throughput rate value Drh considered to be acceptable by the request Tt. Should the throughput rate value Drh0 specified by the terminal Th be considered to be acceptable by the terminal Tt, it could send an acknowledgment signal Tun(Strh,Drh0) having a form similar to that of the setting signal that is a carrier of a setting value equal to the specified value Drh0 in order to confirm to the terminal Th the acceptance by the terminal Tt of this throughput rate value Drh0 for the new stream Strh whose set-up has been requested.

Figure 2:
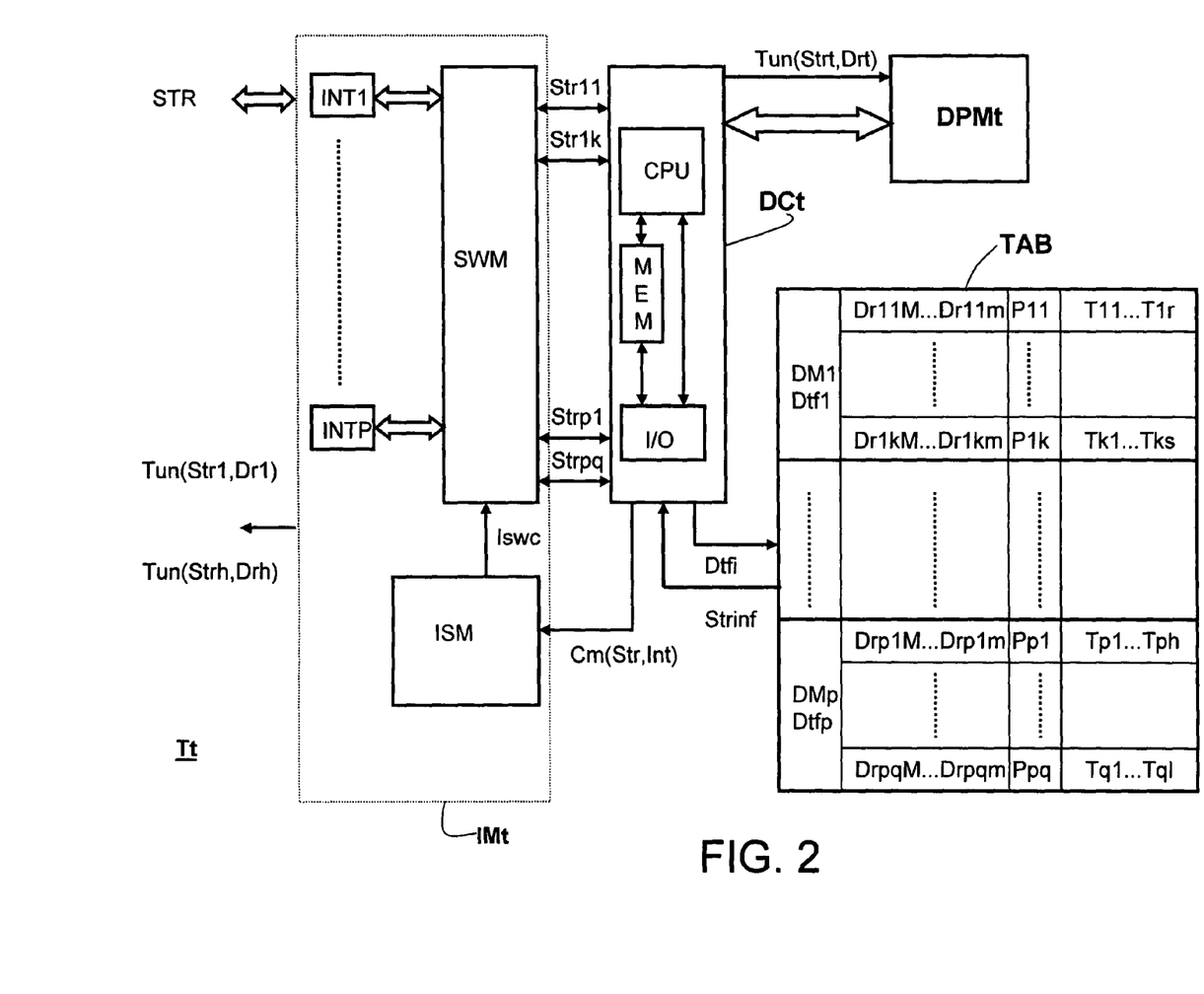
FIG. 2 is a function diagram representing a terminal included in a telecommunications system of this kind.

FIG. 2 gives a view in greater detail of the terminal Tt included in the telecommunications system described here above. As explained here above, this terminal Tt comprises interface means IMt which, in the exemplary embodiment illustrated herein, include switching means SWM capable of obtaining a switchover to a new interface of a particular stream initially traveling through a given interface, a switching of this kind being possibly capable of coming into play when the maximum throughput rate value offered by the given interface is below a sum of throughput rate values assigned to the streams effectively traveling through said interface.

In the example illustrated herein, the terminal Tt comprises a throughput rate monitoring value DCt that contains a central processing unit CPU capable of controlling input/output means I/O and a memory MEM in which there is stored, in the form of a sequence of instructions, a method according to an embodiment of the invention aimed at obtaining an optimization of the distribution of the streams (Str11 ... Str1$k$) ... (Strp1 ... Strpq) over the various interfaces INT1 ... INTP.

In the present example, the monitoring module DCt includes means for setting effective throughput rates of the streams (Str11 ... Str1$k$) ... (Strp1 ... Strpq) that are to go through the interfaces INT1 ... INTP, said setting means being capable of sending a setting signal Tun(Strj,Drj) to a sender entity that has generated a particular stream, this setting signal Tun(Strj,Drj) carrying at least one identifier of said stream Strj (for j=1 ... t ... h in the example described here) and a value Drj of the throughput rate that must be allocated to this particular stream Strj, said setting signal Tun(Strj,Drj) being aimed at informing this sender entity of the fact that the throughput rate of the stream considered is too great and must be reduced at source, which will be either constituted by the processing means DPMt when the stream Strj concerned is an outgoing stream or included in a remote terminal when the stream considered is an incoming stream, in which case a setting signal will be sent to it through the interface assigned to this stream, as is the case here for setting signals Tun(Str1,Dr1) and Tun(Strh,Dhr).

In the mode of implementation described here, the terminal Tt includes means of storage of a table TAB in which, within segments each pertaining to an interface INTi (for i=1 to P) pieces of information on this interface are grouped together, especially information on the maximum throughput rate DMi made available by this interface INTi and the cumulative throughput rate Dtfi of the various streams to which this interface has been assigned. The monitoring module DCt is herein designed for the recording within this table TAB of the information on the throughput rates of the different streams going through the various interfaces and for the extraction from this table TAB of the information Strinf pertaining to these streams. If, in the example described here, the table TAB is recorded outside the monitoring module DCt, this table TAB could be stored in other modes of implementation of the invention within the very memory MEM included in the monitoring module DCt.

In the example of implementation of the invention described herein, each segment of the table TAB furthermore includes a plurality of scales of nominal throughput rate values each assigned to a stream going through the interface considered and conveyed in fields included in said streams, for example the scales of values referenced (Dr11M ... Dr11$m$) ... Dr1$k$M ... Dr1$km$) respectively assigned to the streams Str11 ... Str1$k$ going through the interface INT1. An index "M" indicating an upper limit and an index "m" indicating a lower limit, the lowest of the nominal throughput rates Dr1jm assigned to a stream Str1j (for j=1 to k) constitute the minimum throughput rate proper to said stream Str1j, each of these streams being furthermore provided with a degree of priority P11 . . . P1k proper to it, each stream Str11 . . . Str1k being furthermore associated with a predefined set (T11 . . . T1r) . . . (Tk1 . . . Tks) of types of interfaces with which this stream is compatible, arranged in a predetermined order of preference.

The monitoring module DCt is capable of detecting a saturation of a given interface, for example the interface INT1, which will be expressed by the fact that a cumulative value Dtf1 of the throughput rates of the streams (Str11 . . . Str1k) assigned to this interface becomes greater than a value DM1 of the available throughput rate effectively offered at the instants considered by the given interface INT1. This monitoring module DCt could then send firstly at least one setting signal Tun(Strj,Drj) intended for the sender entity sending the stream Strj which will thus receive an instruction to set the throughput rate of said stream Strj at a value Drj and, on the other hand, a switching signal Cm(Str,Int) intended for a control module ISM of the switching means SWM and carrying an identifier Int of the interface that must be assigned to a stream Str. Thus, the monitoring module DCt, in addition to the possibility of increasing or reducing the throughput rate of the stream Strj traveling through interface means IMt, has the possibility of ordering the re-assignment of a stream Str to an interface other than its own current interface by producing an interface identifier Int distinct from the one currently assigned to said stream Str, the type of the new interface being chosen by descending order of preference within the set of types of interfaces with which this stream is compatible. To this end, the control module ISM will decode the switching signal Cm(Str,Int) and will produce a control signal Iswc to control the switching means SWM in order to execute the instructions conveyed by said switching signal Cm(Str,Int). If, in the example described here, the control module ISM is placed outside the monitoring module DCt, this control module ISM can be integrated within the monitoring module DCt in other modes of implementation of the invention.

Figure 3:
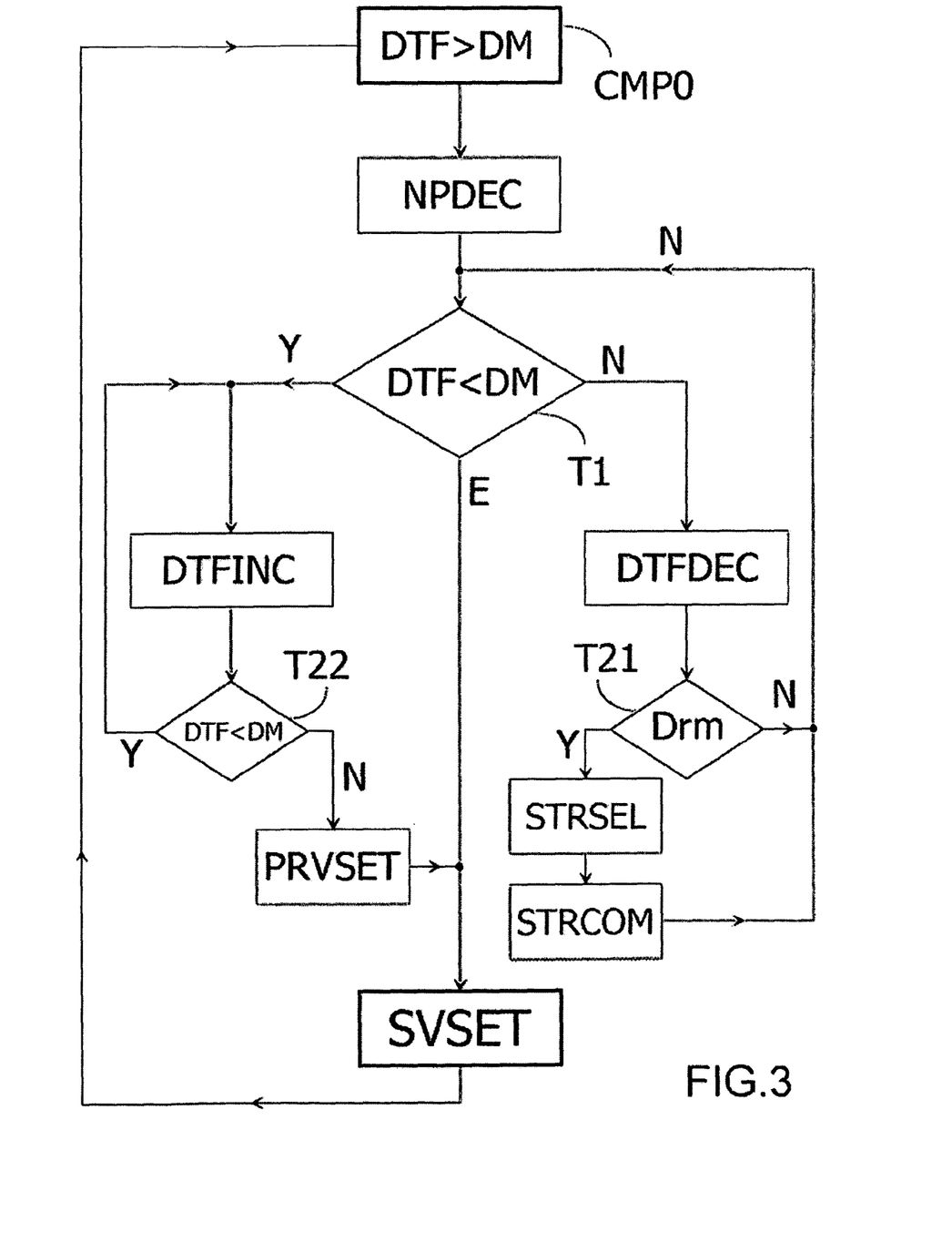
FIG. 3 is a sequential diagram representing a method compliant with an advantageous mode of implementation of an embodiment of the invention.

FIG. 3 is an illustration in the form of a diagram of steps of the working of a data transmission method that permits optimal management of the resources offered by a particular interface in compliance with a particular mode of implementation of the invention. This method is distinguished in that it includes an initial comparison step CMP0 during which a cumulative value DTF resulting from a sum of throughput rate values associated with the various streams to which the particular interface has been assigned is compared with a maximum value DM of the throughput rate offered by said particular interface at the instant considered. When it is noted that the cumulative throughput rate DTF is greater than the maximum throughput rate value DM, a step NPDEC for the reduction of the throughput rates of the non-priority streams is executed. A step comprising a first type of test T1 is then executed for the purpose of determining whether the reduction of the throughput rates of the non-priority stream has been sufficient to decongest the interface. This is done by comparing the maximum throughput rate value DM with a new cumulative value DTF obtained after execution of the setting step. If the answer is negative, a step DTFDEC for reduction of the throughput rates of the priority streams is executed. This reduction done here by stages, i.e. after the value of the throughput rate of a priority stream has been replaced by its immediately lower nominal value, a new first type of test T1 step will be executed to determine whether the newly performed reduction has been sufficient to decongest the interface. Thus, as explained here above, various steps DTFDEC for reduction of the throughput rates allocated by the interface to the priority streams could be executed according to several possible alternative modes of operation. It is thus possible to choose a first option in which several successive reductions are made on several distinct streams to which a same degree of priority has been allocated so as to penalize none of these streams relative to its peers. It is possible, on the contrary, to choose a second option of continuing the reduction of the throughput rate of a particular stream until its minimum value is reached and only then starting to reduce the throughput rate of another stream to which a same degree of priority has been allocated, and so on and so forth until the interface has been decongested. It is furthermore possible to envisage carrying out only one throughput rate reduction operation for each stream to reduce this throughput rate to its minimum value at one stroke.

Assuming that the throughput rates of the different priority values have all been reduced to their minimum value Drm without the interface being thereby decongested, this point being determined through a second step for a second type of test T2 combined iteratively with the step for a first type of test T1, one of the streams showing the lowest degree of priority will be selected during a selection step STRSEL to be subjected to a switching operation and redirected to another interface during a switching step STRCOM. If several streams have a same minimum degree of priority, an arbitrary selection among these streams will be made during the selection step STRSEL for the purpose of choosing that one of the streams which will be subjected to the switching step. A new step for performing a first type of test T1 will then make it possible to determine whether this switching will be sufficient to decongest the interface, which amounts to making an a posteriori comparison between the minimum throughput rate Drm of the stream selected and the available throughput rate offered to this stream by its current interface. So long as the interface is saturated, non-priority streams will be subjected to new switching steps STRCOM.

Assuming that all the streams having a degree of priority lower than a predetermined threshold have been subjected to the switching step STRCOM without the interface being thereby decongested, one or more priority streams would have to be subjected in turn to the switching step STRCOM. The stream selected to this end during the selection step STRSEL will then be the one whose minimum throughput rate Drm makes it possible, when subtracted from the value of the cumulative throughput rate DTF of the streams traveling through the interface considered, to obtain a value that is the closest value to that of the available throughput rate DM offered by this interface.

In one mode of implementation of the invention other than the one represented here, the selection of the stream to be subjected to the switching step STRCOM could be done according to a sequence which is the reverse of the one described here above. In this sequence, the stream preferably subjected to the switching step STRCOM will be that one of the streams whose disappearance will enable the attaining of a cumulative value DTF that is closest to the maximum throughput rate value DM offered by the interface, independently of the degree of priority of this stream. The degrees of priority are then intended to be taken into account only in the presence of two streams whose disappearance would produce identical effects in terms of release of bandwidth.

The iterative process described here above will continue until the available throughput rate DM again becomes greater than or equal to the value of the cumulative throughput rates DTF. In the event of perfect equality, the setting thus obtained is saved during a step SVSET for validation of the parameters. This step will itself be followed by a new comparison step CMP0 in order to carry out constant monitoring of the conditions of communication of the interface thus enabling the configuration to be adapted dynamically.

It could furthermore happen, in very unfavorable circumstances, that the sequences of reduction and switching steps described further above do not lead to a decongestion of the interface considered in which case it will be necessary to perform a step of elimination of one or more particular streams which could be chosen by ascending or descending order of priority or again as a function of the bandwidth released by the elimination of said streams, by transposition of the above explanations. Such an elimination step of this kind is not illustrated here but is intended for insertion between a switching step STRCOM and a step for a test of the first type T1.

If a step for a test of the first type T1 reveals on the contrary that there remains a fragment of bandwidth available, a following step DTFINC for increasing the throughput rate of a stream having a higher degree of priority will be performed, for example by the selection of its nominal throughput rate value immediately greater than its current throughput rate value, said step DTFINC for increasing the throughput rate being followed by a step for a test of a third type T22, similar to a step for a test of a first type and aimed at determining whether this increase has had the effect of again saturating the interface. If this is the case, it is the preceding throughput rate setting that will be saved during a step PRVSET for validation of the parameters. If not, a new step DTFINC for increasing the throughput rate will be executed and then subjected to validation by a new step for the third type of test T22, the different streams subjected to successive steps DTFINC for increasing the throughput rate being chosen by descending order of priority.

These increasing steps are used to complete the optimizing of the management of bandwidth of the interface considered when an embodiment of the invention thus performs a dynamic and almost real-time reduction of the resources devoted by said interface to the transit of the streams having the lowest priority to the benefit of an increase in the resources devoted to the streams having the highest priority.

An aspect of the present disclosure aims to propose a method of data transmission in which the phenomena of congestion of one or more interfaces of a terminal will be immediately detected and swiftly taken into account so as to prevent, to the extent possible, any interruption of streams because of saturation of the corresponding interface. In particular, an aspect of the present disclosure enables a given terminal to control a setting of the bit rate of streams going through one or more interfaces with which it is provided in order to permit optimum and dynamic management of resources offered by said interface or interfaces.

Although the present disclosure has been described with reference to one or more examples, workers skilled in the art will recognize that changes may be made in form and detail without departing from the scope of the disclosure and/or the appended claims.

The invention claimed is:

1. Method of data transmission within a telecommunications system including a plurality of terminals capable of exchanging data flows through a plurality of communications networks, the method comprising:
   a step of comparison between a maximum throughput rate value offered by an interface through which a particular stream travels and a cumulative value resulting from a sum of throughput rate values to be assigned to the streams that are to travel through said interface,
   a step of obtaining a setting value, among a plurality of nominal throughput rate values acceptable for at least one particular data stream, and
   after said obtaining step is executed, a step of setting a throughput rate by a sender entity sending said particular stream, if the maximum throughput rate value offered by the interface is below the cumulative value, wherein the lowest value between said setting value and the value currently assigned to said particular stream by the sending entity is assigned to the throughput rate of said particular stream,
   a step of switching by one of the terminals communicating through numerous interfaces, during which another interface is assigned to a stream subjected to this switching step when the maximum throughput rate value offered by the interface is below the cumulative value that results from said step of setting.

2. Method according to claim 1, wherein the method includes a step of determining said plurality of nominal throughput rate values acceptable for at least one particular data stream, the setting value transmitted during execution of the step of setting the throughput rate of a particular stream being formed by the nominal throughput rate value proper to said particular stream which is immediately lower than its current throughput rate.

3. Method according to claim 1, wherein the method includes a step of selection of one of these streams having a minimum throughput rate that makes it possible, when the minimum throughput rate is subtracted from the sum of the values of throughput rates assigned to the streams that are to travel through the interface considered, to obtain a value that is closest to that of the available throughput rate offered by this interface, the stream thus selected being then submitted to a switching step.

4. Method according to claim 3, wherein furthermore includes a step of increasing the throughput rate following a switching step and designed to increase the throughput rate of a particular stream subjected to said increasing step.

5. Method according to claim 1, wherein the method furthermore includes a step of classification, in a predetermined order of priority, of the various streams assigned to each interface, the streams that have to be subjected to a throughput-rate setting step being then selected by ascending order of priority.

6. Method according to claim 5, wherein the stream that has to be subjected to a switching step is selected by ascending order of priority.

7. Method according to claim 6, wherein any subjecting of a given stream to the switching step is inhibited so long as the throughput rate effectively allocated by the interface to said given stream has not been reduced to a minimum value.

8. Method according to claim 7, wherein any subjecting of a stream to the switching step is inhibited so long as the throughput rates effectively allocated by the interface to the streams that go through it have not all been reduced to their respective minimum values.

9. Method according to claim 1, wherein any subjecting of a given stream to the switching step is inhibited so long as the throughput rate effectively allocated by the interface to said given stream has not been reduced to a minimum value.

10. Method according to claim 9, wherein any subjecting of a stream to the switching step is inhibited so long as the throughput rates effectively allocated by the interface to the streams that go through it have not all been reduced to their respective minimum values.

11. Telecommunications system including a plurality of terminals capable of mutually exchanging data streams through a plurality of communications networks, said system comprising:
- means for comparing between a maximum throughput rate value offered by an interface through which a particular stream travels and a cumulative value resulting from a sum of throughput rate values to be assigned to the streams that are to travel through said interface,
- means for obtaining a setting value, among a plurality of nominal throughput rate values acceptable for at least one particular data stream, and
- throughput-rate setting means capable of setting the throughput rate of said particular stream and activated by transmission of said setting value to a sender entity sending said stream when the maximum throughput rate value offered by the interface is lower than the cumulative value, said throughput-rate setting means being adapted to assign to the throughput rate of said particular stream the lowest value between said setting value and the value currently assigned to said particular stream,
- means for switching within one of the terminals communicating through numerous interfaces, which assigns another interface to a stream subjected to switching when the maximum throughput rate value offered by the interface is below the cumulative value that results from said setting means assigning the lowest value.

12. Terminal capable of at least one of sending or receiving at least one data stream, the terminal comprising:
- means for comparing between a maximum throughput rate value offered by an interface through which a particular stream travels and a cumulative value resulting from a sum of throughput rate values to be assigned to the streams that are to travel through said interface,
- means for obtaining a setting value, among a plurality of nominal throughput rate values acceptable for at least one particular data stream, and
- throughput-rate setting means capable of setting the throughput rate of said particular stream and activated when the maximum throughput rate value offered by the interface is lower than the cumulative value after obtaining said setting value which is produced when the maximum throughput rate value offered by the interface is lower than the cumulative value, said throughput-rate setting means being adapted to assign to the throughput rate of said particular stream the lowest value between said setting value and the value currently assigned to said particular stream, and
- switching means for assigning another interface to at least of said data streams when the maximum throughput rate value offered by the interface is below the cumulative value that results from said setting means.

13. Computer program product stored in at least one of a memory of a central processing unit or a non-transitory memory carrier designed to cooperate with a reader of said central processing unit, said program being designed to be implemented within a terminal capable of at least one of sending or receiving at least one data stream through numerous interfaces, said program including:
- at least one instruction ordering execution of a step of comparison between a maximum throughput rate value offered by an interface through which a particular stream travels and a cumulative value resulting from a sum of throughput rate values to be assigned to the streams that are to travel through said interface,
- at least one instruction ordering execution of a step of obtaining a setting value, among a plurality of nominal throughput rate values acceptable for at least one particular data stream,
- at least one instruction ordering execution of a step of transmission of said setting value to a sender entity that sends said particular stream, said transmission step being executed when the maximum throughput rate value offered by the interface is lower than the cumulative value, and
- at least one instruction ordering execution of a switching step, which assigns another interface to at least one of the data streams when the maximum throughput rate value offered by the interface is below the cumulative value that results from said step of transmission of said setting value.

14. A non-transitory computer-readable storage medium in which there is stored a computer program compliant with claim 13.

* * * * *